United States Patent [19]

Kuller

[11] Patent Number: 4,894,259
[45] Date of Patent: Jan. 16, 1990

[54] PROCESS OF MAKING A UNIFIED PRESSURE-SENSITIVE ADHESIVE TAPE

[75] Inventor: Douglas H. Kuller, St. Paul, Minn.

[73] Assignee: Minnesota Mining and Manufacturing Company, St. Paul, Minn.

[21] Appl. No.: 212,596

[22] Filed: Jun. 28, 1988

Related U.S. Application Data

[63] Continuation-in-part of Ser. No. 90,671, Aug. 27, 1987, which is a continuation-in-part of Ser. No. 84,781, Aug. 17, 1987, which is a continuation-in-part of Ser. No. 900,372, Aug. 29, 1986, abandoned.

[51] Int. Cl.⁴ .............................................. B05D 5/10
[52] U.S. Cl. .............................. 427/208.8; 427/54.1; 427/333

[58] Field of Search ................ 427/54.1, 208.8, 333; 428/220, 336, 345, 354

Primary Examiner—Bernard Pianalto
Attorney, Agent, or Firm—Donald M. Sell; Walter N. Kirn; Darla P. Neaveill

[57] ABSTRACT

A process of making pressure-sensitive adhesive tape comprising a plurality of concurrently coated superimposed layers, at least one outer layer being a pressure-sensitive adhesive layer, contiguous layers defining an interface therebetween, each of the layers comprising a photopolymerized matrix of polymeric chains; the polymeric chains extending from the matrix of one of the layers through the interface into the matrix of a contiguous layer; the polymeric chains comprising photopolymerized monomers having migrated from the matrix of each contiguous layer prior to photopolymerization, whereby the layers cannot be delaminated.

3 Claims, 1 Drawing Sheet

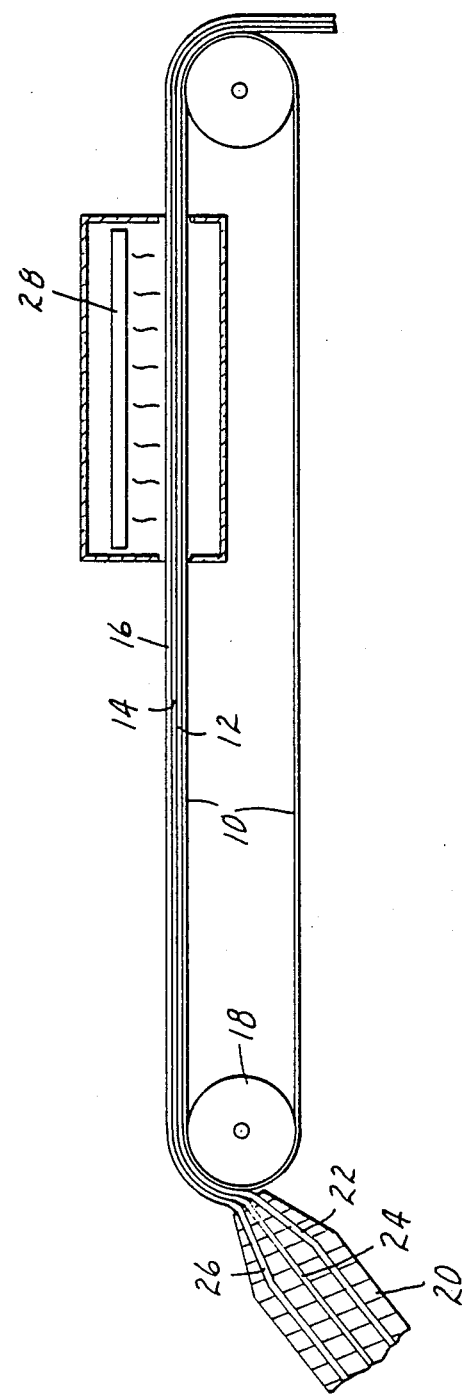

PROCESS OF MAKING A UNIFIED PRESSURE-SENSITIVE ADHESIVE TAPE

RELATED APPLICATION

This application is a continuation-in-part of U.S. Ser. No. 90,671, filed on Aug. 27, 1987, which is a continuation-in-part of U.S. Ser. No. 084,781 (Zimmerman et al.), filed Aug. 17, 1987, which is a continuation-in-part of U.S. Ser. No. 900,372 (Zimmerman et al.), filed on Aug. 29, 1986, now abandoned.

BACKGROUND OF THE INVENTION

1. Field of the Invention

The invention concerns photopolymerizable pressure-sensitive adhesive tapes comprising a plurality of contiguous layers which cannot be delaminated. Each of the layers comprises a photopolymerized matrix of polymeric chains, and at least one of the outer layers is photopolymerized to a pressure-sensitive adhesive state. This invention also concerns a process for concurrently coating tapes incorporating such layers.

2. Description of the Related Art

The invention concerns photopolymerizable pressure-sensitive adhesive tapes. U.S. Pat. RE No. 24,906 (Ulrich), reissued on Dec. 20, 1960, discloses pressure-sensitive adhesive tapes, the adhesive layers of which comprise copolymers consisting essentially of monomers of acrylic acid esters of non-tertiary alkyl alcohols having from 1-14 carbon atoms, and at least one monomer copolymerizable therewith.

U.S. Pat. No. 4,181,752 (Martens et al.) discloses a process for making pressure-sensitive adhesive tape which involves the photopolymerization of the alkyl esters of acrylic acid and the modifying monomers to form the acrylate copolymers. It is also disclosed that the intensity and spectral distribution of the irradiation must be controlled in order to attain desirably high peel resistance and cohesive strength. The process disclosed is preferably carried out in the absence of oxygen and air which inhibit the polymerization reaction. Thus, it is normally carried out in an inert atmosphere such as nitrogen, carbon dioxide, helium, argon, etc. Air can also be excluded by sandwiching the liquid photopolymerizable mixture between layers of solid sheet material and irradiating through the sheet material. Each layer must be coated and cured before the addition of another layer.

U.S. Pat. No. 4,243,500 (Glennon) discloses a pressure-sensitive adhesive formed from a composition comprising mono-functional unsaturated acrylate ester monomer, essentially saturated tackifying resin polymer dissolved in the acrylate ester, non-crystallizing elastomeric material also dissolved in the acrylate ester and an initiator responsive to ultraviolet light or other penetrating radiation such as electron beam, gamma, or X-ray radiation. The intensity of the lamps taught by Glennon is much greater than those taught by Martens.

One embodiment of a pressure-sensitive adhesive tape is commonly called a "transfer tape" in that it typically has a low-adhesion liner from which it is transferred when used. Such a tape can also be linerless as disclosed in U.S. Pat. Nos. 2,889,038 (Kalleberg) and 4,522,870 (Esmay). One embodiment of the invention, like those tapes of U.S. Pat. Nos. 4,223,067 (Levens), and 4,514,615 (Esmay), has a foam-like appearance and character, even though it is not a foam.

The double-coated pressure-sensitive adhesive tape of U.S. Pat. No. 2,889,038 (Kalleberg) comprises a flexible support having on opposite faces chemically different pressure-sensitive adhesive layers which are physically incompatible, thus enabling the tape to be wound directly upon itself into a roll for storage and shipment. The tape is made by successively coating and drying solutions of two different pressure-sensitive adhesives onto opposite faces of a flexible web. To test for the incompatibility of the two pressure-sensitive adhesives, a solution of one of the pressure-sensitive adhesives is coated onto an undried coating of the other, and the coatings are simultaneously dried at room temperature for 24 hours to evaporate the solvents. Physical incompatibility is demonstrated by peeling the dried layers apart.

The double-coated pressure-sensitive adhesive tape of the above-cited Esmay patent is similar to that of the Kalleberg patent except that both adhesive faces can have truly high performance, and the adhesive layers at the two faces of the flexible web do not need to be either chemically different or physically incompatible. This is achieved when the pressure-sensitive adhesive at each of the faces is a polymer of predominantly alkyl acrylate, substantially solvent-free, and crosslinked. The Esmay patent states: "It is surmised that if the adhesive were not substantially solvent-free, the solvent would allow the polymer chains to knit across adjacent convolutions during prolonged storage in roll form, such that perfect separation could no longer be assured. In the present state of the art, it would not be commercially feasible to coat a pressure-sensitive adhesive from solution and obtain a pressure-sensitive adhesive layer which is substantially solvent-free. To keep the amount of solvent to a minimum, the (Esmay) tape is preferably made using photopolymerization as in U.S. Pat. No. 4,181,752 (Martens et al.)" (col. 2, lines 21–32).

The Esmay patent discloses that a "technique for enhancing immediate adhesion to relatively rough or uneven surfaces is to incorporate glass microbubbles into the pressure-sensitive adhesive as taught in U.S. Pat. No. 4,223,067 (Levens)" (col. 4, lines 31,35). Because the microbubble-containing tape of the Levens patent has a foam-like appearance and character, it is sometimes called a "foam-like" tape even though its pressure-sensitive adhesive layer is substantially free of voids except for the hollow spaces within the microbubbles. The Levens patent in turn teaches that where it is desired to adhere the foam-like tape "to a surface to which its pressure-sensitive adhesive layer would not form a strong bond, it may be desirable to apply to one or both of its faces of its microbubble-filled adhesive layer a layer of unfilled pressure-sensitive adhesive which is especially selected for adhesion to that surface" (col. 4, lines 9–15). Such microbubble-free surface layers can also provide substantially increased cohesive strength, especially at high temperatures. Multiple microbubble-free surface layers can have different adhesive properties, each selected for good adhesion to a certain surface. Because the application of those added layers substantially increase the cost of the foam-like tape, less expensive foam-backed tapes have dominated the market for uses requiring immediate adhesion to rough or uneven surfaces.

The microbubbles can be glass as in the examples of the Levens patent, or they can be polymeric as described in U.S. Pat. No. 3,615,472 (Morehouse et al.) or U.S. Pat. No. 4,287,308 (Nakayama et al.).

U.S. Pat. Nos. 4,710,536 and 4,749,590, (Klingen, et al.), disclose the use of certain hydrophobic silicas as fillers for photopolymerized pressure-sensitive adhesive tapes. Preferred silicas have surface areas of at least 10 m$^2$/g. It is disclosed that the presence of the filler increases the internal strength of the tape.

SUMMARY OF THE INVENTION

The invention relates to a pressure-sensitive adhesive tape comprising a plurality of concurrently coated superimposed layers, the layers having been simultaneously photopolymerized, at least one outer layer being a pressure-sensitive adhesive layer containing at least one alkyl acrylate ester of a nontertiary alcohol and a photoinitiator, contiguous layers defining an interface therebetween, each of the layers comprising a photopolymerized matrix of polymeric chains; the polymeric chains extending from the matrix of one of the layers through the interface into the matrix of a contiguous layer; the polymeric chains comprising polymerized monomers having migrated from the matrix of each contiguous layer prior to polymerization, whereby the layers cannot be delaminated.

The novel product differs from tapes of the prior art in that the monomers of the pressure-sensitive adhesive matrix migrate across the interface prior to and during photopolymerization so that after photopolymerization the polymer chains extending through the interface comprise a substantial amount of monomers originally from both sides of the interface. This yields layers which cannot be physically delaminated.

The present invention embraces a variety of embodiments. One group of preferred embodiments of the present invention is that of pressure-sensitive adhesive tapes which are at least equal in performance to multi-layer foam-like tapes of the Levens and Esmay patents, but can be produced at significantly lower cost. A second group of preferred embodiments is that of cost-effective, double-coated, pressure-sensitive adhesive tapes. Such tapes may have identical or differing adhesives at each surface. Such tapes may further comprise one or more non-adhesive layers selected from a multitude of polymeric matrices, i.e., flexible or foam-like supports between the adhesive layers, or releasable liners.

An especially preferred embodiment of the present invention is a pressure-sensitive adhesive tape comprising thin layers heretofore not possible in photopolymerized tapes. Such tapes have layers ranging in thickness from about 2.5 micrometers (0.10 mil) to about 38 micrometers (1.5 mil) each.

As used herein, the term "tape" includes but is not limited to, those adhesive strips which are single-coated adhesive layers permanently attached to a backing or support, double-coated adhesive strips having flexible supports with an adhesive layer on both sides thereof, and adhesive strips with no support or backing, such being typically though not necessarily releasably attached to a low-adhesion liner, and commonly called "transfer tapes".

As used herein, the terms "concurrent coating" and "concurrently coated" and the like refer to any method of coating wherein the layers to be coated contact each other prior to any contact with the carrier web.

The present invention also relates to a process for making a pressure-sensitive adhesive tape comprising the steps of:

(1) preparing a plurality of coatable compositions, each of the coatable compositions comprising at least one photopolymerizable monomer; at least one of the coatable compositions being curable to a pressure-sensitive adhesive state, monomers of each of the coatable compositions being copolymerizable when blended and subjected to photopolymerization conditions;

(2) concurrently coating the coatable compositions to provide a plurality of superimposed layers with contiguous layers defining an interface therebetween, with one composition which is curable to a pressure-sensitive adhesive state being coated as an outer layer;

(3) permitting migration of photopolymerizable monomers through the interface between contiguous layers; and (4) subjecting the superimposed layers to irradiation to simultaneously photopolymerize the monomers in each layer, and to provide polymeric chains comprised of copolymers of photopolymerizable monomers originating from contiguous layers extending through the interface therebetween thereby to produce a tape having layers which cannot be delaminated.

All parts, percentages and ratios described herein are by weight unless otherwise identified.

DETAILED DESCRIPTION OF THE INVENTION

Each of the layers of tapes of the invention comprises a photopolymerizable matrix comprising polymeric chains. These matrices may comprise a multitude of polymers; however, all matrices must be photopolymerizable, preferably by the ultraviolet portion of the spectrum (220–440 nm). At least one outer layer must be photopolymerizable to a pressure-sensitive adhesive state.

Such pressure-sensitive adhesive layer of the novel tape has a photopolymerizable matrix comprising an acrylic pressure-sensitive adhesive.

The acrylic pressure-sensitive adhesives useful in the present invention are alkyl acrylates, preferably monofunctional unsaturated acrylate esters of non-tertiary alkyl alcohols, the molecules of which have from 1 to about 14 carbon atoms. Included within this class of monomers are, for example, isooctyl acrylate, isononyl acrylate, 2-ethyl-hexyl acrylate, decyl acrylate, dodecyl acrylate, n-butyl acrylate, and hexyl acrylate. Preferred monomers include isooctyl acrylate, isononyl acrylate, and butyl acrylate. The alkyl acrylate monomers can be used to form homopolymers for the photopolymerizable polymer or they can be copolymerized with polar copolymerizable monomers. When copolymerized with strongly polar copolymerizable monomers, the alkyl acrylate monomer generally comprises at least about 75% of the photopolymerizable polymers. When copolymerized with moderately polar copolymerizable monomers, the alkyl acrylate monomer generally comprises at least about 70% of the photopolymerizable polymer.

The polar copolymerizable monomers can be selected from strongly polar copolymerizable monomers such as acrylic acid, itaconic acid, hydroxyalkyl acrylates, cyanoalkyl acrylates, acrylamides or substituted acrylamides, or from moderately polar copolymerizable monomers such as N-vinyl pyrrolidone, acrylonitrile, vinyl chloride or diallyl phthalate. The strongly polar copolymerizable monomer preferably comprises up to about 25%, more preferably up to about 15%. The moderately polar copolymerizable monomer preferably comprises up to about 30%, more preferably from 5% to about 30% of the photopolymerizable polymer.

The pressure-sensitive adhesive matrix of the novel tape of the invention also contains a photoinitiator to induce polymerization of the monomers. Photoinitiators that are useful for polymerizing the acrylate monomer include the benzoin ethers, substituted benzoin ethers such as benzoin methyl ether or benzoin isopropyl ether, substituted acetophenones such as 2,2-diethoxyacetophenone, and 2,2-dimethoxy-2-phenyl-acetophenone, substituted alpha-ketols such as 2-methyl-2-hydroxypropiophenone, aromatic sulphonyl chlorides such as 2-naphthalene sulphonyl chloride, and photoactive oximes such as 1-phenyl-1,1-propanedione-2-(O-ethoxycarbonyl) oxime. Generally, the photoinitiator is present in an amount of from about 0.01 part to about 1.0 parts based on 100 parts monomer weight.

Where superior cohesive strengths are desired, the pressure-sensitive adhesive matrix of the novel tape should be cross-linked. The mixtures of the elastomer and the photopolymerizable monomers may also contain a crosslinking agent. Preferred crosslinking agents for an acrylic pressure-sensitive adhesive are multifunctional acrylates such as 1,6-hexanediol diacrylate as well as those disclosed in U.S. Pat. No. 4,379,201 (Heilmann et al.), incorporated herein by reference, such as trimethylolpropane triacrylate, pentaerythritol tetracrylate, 1,2-ethylene glycol diacrylate, and 1,2-dodecanediol diacrylate. Crosslinking is especially easy to control when photopolymerizing the monomer in admixture with a multiacrylate crosslinking agent. Other useful crosslinking agents include the substituted triazines, such as those disclosed in U.S. Pat. Nos. 4,329,384 and 4,330,590 (Vesley), both incorporated herein by reference, e.g., 2,4-bis(trichloromethyl)-6-p-methoxystyrene-5-triazine and the chromophore halomethyl-5-triazines. Each of the crosslinking agents is typically present in the range of from about 0.01% to about 5% of the total weight of the monomers.

Among pressure-sensitive adhesives which are useful for the pressure-sensitive adhesive layer of the novel tape are those which become tacky only at elevated temperatures, e.g., acrylic copolymers having average carbon-to-carbon chains of less than 4 carbon atoms or those comprising a polymer wherein methacrylic acid esters are substituted for portions of acrylic acid esters.

Tapes of the invention may comprise more than one pressure-sensitive adhesive layer. In such tapes, the pressure-sensitive adhesive layers may comprise similar or different adhesive compositions, in like or unlike thicknesses, having similar or different additives.

In one particularly preferred embodiment of the invention, one layer of the pressure-sensitive adhesive tape comprises a phase-separated pressure-sensitive adhesive containing
  (a) from about 70 parts to about 98 parts of an acrylic copolymer of monomers containing:
    (i) from about 60 to about 99 parts of an alkyl acrylate monomer, the alkyl groups of which have an average of 4 to 12 carbon atoms, and
    (ii) from about 1 part to about 40 parts of a monoethylenically unsaturated polar copolymerizable monomer, and
    (iii) from about 0.01 part to about 1 part of a photoinitiator, and
  (b) correspondingly, from about 30 parts to about 2 parts of a hydrocarbon elastomer or blend of hydrocarbon elastomers containing at least one segment having a lower $T_g$ than the acrylic copolymer, wherein the adhesive has at least a first phase and a second phase, the first phase consisting primarily of the elastomer, and preferably being a continuous phase.

While any layer of the pressure-sensitive adhesive tapes of the invention may contain the phase-separated adhesive, it is most preferably contained in the outer layer.

Elastomers preferred for use in such adhesive layers are those multisegmented elastomers having at least one unsaturated segment, as such segments have lower $T_g$ values than saturated hydrocarbon segments, and are able to co-react with growing acrylic polymer chains. Such preferred elastomers include Stereon TM 840A and Stereon TM 845A, styrene-butadiene multiblock copolymers available commercially from Firestone, Duradene TM 710, a butadiene-styrene copolymer with 27% styrene, also available from Firestone; Kraton TM D1118, a styrene butadiene diblock copolymer, and Kraton TM D1101, a styrene butadiene-styrene triblock copolymer, both Kraton TM copolymers available commercially from Shell Chemical Company. The addition of elastomers having at least, one unsaturated segment to the acrylic copolymers at preferred levels yields phase-separated pressure-sensitive adhesives having at least two phases, wherein the elastomer forms a continuous first phase and the acrylic copolymer forms the second phase. Such a composition provides substantial improvement in low temperature shock properties to the adhesive tape while maintaining otherwise acceptable adhesive properties such as shear and peel.

When a composition incorporating such an elastomer is examined by Transmission Electron Microscopy (TEM), the phase-separated morphology is clearly visible. In preferred compositions, the elastomeric phase is continuous, and the acrylic copolymer phase exists as relatively uniform inclusions averaging from 0.1 micrometer to about 1 micrometer in size. When highly preferred elastomers such as Duradene TM 710 are utilized, the inclusions are about 0.5 micrometer.

Where a foam-like pressure-sensitive adhesive tape is desirable, a monomer blend comprising microbubbles may be used as a backing or core layer. The microbubbles may be glass as taught in the Levens patent, supra, or they may be polymeric. The microbubbles should have an average diameter of 10 to 200 micrometers, and comprise from about 5 to about 65 volume percent of the pressure-sensitive adhesion layer.

Preferred glass microspheres have average diameters of about 80 micrometers. When glass microbubbles are used, the thickness of the foam-like layer should be at least six times, preferably at least twenty times that of each microbubble-free layer. The thickness of the layer should preferably exceed three times the average diameter of the microbubbles and twice the diameter of substantially every microbubble. The thickness of foam-like layers in preferred tapes of the invention range from 0.3 mm to about 4.0 mm in thickness.

Especially preferred microspheres are polymeric microspheres, such as those described in U.S. Pat. Nos. 3,615,972, 4,075,238, and 4,287,308, all of which are incorporated herein by reference. The microspheres are available from the Pierce & Stevens Company under the trade name "Microlite" in unexpanded form and "Miralite" in expanded form. Similar microspheres are available from Kema Nord Plastics under the trade name "Expancel" and from Matsumoto Yushi Seiyaku under the trade name "Micropearl". In expanded form, the microspheres have a specific density of approximately 0.02–0.036 g/cc. It is possible to include the unexpanded microspheres in the core layer and subsequently heat them to cause expansion, but it is generally preferred to mix in the expanded microspheres. This process ensures that the hollow microspheres in the final core layer are substantially surrounded by at least a thin layer of adhesive.

When a microbubble-free pressure-sensitive adhesive tape is desired to be provided on a substantially non-tacky flexible support film, the film, or "core" layer may comprise substantially the same monomers described for the pressure-sensitive adhesive layer, with different ratios of the acrylic acid ester of non-tertiary alcohol and at least one polar copolymerizable monomer. The preferred range of the polar copolymerizable monomer in such a layer ranges from 10% to about 60% of the total monomer mix.

The core layer may also comprise a crosslinking agent and other photopolymerizable ingredients including, but not limited to alkyl vinyl ethers, vinylidene chloride, styrene, and vinyl toluene, only in amounts that do not detract from the desired properties. A preferred additional ingredient is a poly(methylmethacrylate) polymer, (PMMA), which may be present in amounts up to 70% of the total monomer weight, preferably from 30% to about 50% of the total monomer weight. The core layer may also comprise the elastomer containing phase-separated pressure-sensitive adhesive described herein.

Other materials which can be blended with the polymerizable monomer mixture include fillers, tackifiers, foaming agents, antioxidants, plasticizers, reinforcing agents, dyes, pigments, fibers, fire retardants and viscosity adjusting agents.

An especially useful filler material is hydrophobic silica as disclosed in U.S. Pat. Nos. 4,710,536 and 4,749,590, (Klingen, et al.), both of which are incorporated herein by reference. In one preferred embodiment of the present invention, the pressure-sensitive adhesive layer further comprises from about 2 to about 15 phr of a hydrophobic silica having a surface area of at least 10 $m^2/g$.

Tackifiers useful in tapes of the invention include aliphatic polymeric resins which may also contain an aromatic component, and which have a number average molecular weight of from about 300 to about 2500, preferably from about 900 to about 2000, a polydispersity index of less than about 5, a glass transition temperature of about 40° C. to about 120° C., and a solubility parameter of about 7 to 9.5 $(cal/cc)^{-\frac{1}{2}}$. The aliphatic polymeric resins or the aliphatic component of the polymeric resins containing both aliphatic and aromatic components is derived from C-5 or $(C-5)_2$ monomer fractions as described in Satas, *Handbook of Pressure Sensitive Adhesive Technology*, Van Nostrand Reinhold Co., New York, 1982, pp. 353–369, incorporated herein by reference. When tackifier is present, it typically comprises from about 5 parts to about 50 parts per hundred parts resin (phr).

Especially preferred tackifiers are hydrogenated rosin ester tackifying agents. Rosin esters have a higher softening point than unmodified rosins, and higher molecular weight. Ethylene glycol, glycerol, and pentaerythritol are the most common alcohols used for esterification. Rosin esters are quite stable, and resistant to hydrolysis, and such stability increases with hydrogenation. Surprisingly, acrylic ultraviolet-radiation photopolymerized pressure-sensitive adhesives tackified with hydrogenated rosin ester tackifying agents show improved adhesion over solvent-polymerized acrylic pressure-sensitive adhesives containing about 4 to 8 times as much rosin ester tackifier.

Preferred tackifying agents are highly hydrogenated, e.g., hydrogenated glycerine esters commercially available from companies such as Hercules Inc., under such trade names as Foral TM, and Pentalyn TM. Individual tackifiers include Foral TM 65, Foral TM 85, and Foral TM 105. Tackifiers useful in the invention having softening temperatures of from about 65° to about 110°. Use of these tackifiers in tapes of the invention do not significantly prohibit the UV curing when used in the moderate amounts required for compositions of the invention. Many rosin and rosin ester based systems prevent or substantially inhibit ultraviolet-radiation curing when used in effective amounts, and so are not useful in tapes of the invention.

Tapes of the invention may also comprise a woven or nonwoven scrim. Presence of such a scrim will not inhibit migration of the monomers from one layer through the interface to a contiguous layer of the tape.

The present invention also relates to a process for making the pressure-sensitive adhesive tape of the invention, comprising the steps of:

(1) preparing a plurality of coatable compositions, each of the coatable compositions comprising at least one photopolymerizable monomer; at least one of the coatable compositions being curable to a pressure-sensitive adhesive state, monomers of each of the coatable compositions being copolymerizable when blended and subjected to photopolymerization conditions;

(2) concurrently coating the coatable compositions to provide a plurality of superimposed layers with contiguous layers defining an interface therebetween, with one composition which is curable to a pressure-sensitive adhesive state being coated as an outer layer;

(3) permitting migration of photopolymerizable monomers through the interface between contiguous layers; and (4) subjecting the superimposed layers to irradiation to simultaneously photopolymerize the monomers in each layer, and to provide polymeric chains comprised of copolymers of photopolymerizable monomers originating from contiguous layers extending through the interface therebetween, thereby to produce a tape having layers which cannot be delaminated.

Concurrently coating the coatable compositions herein provides advantages not seen with sequential coating of the compositions. When the coatable compositions containing the monomers are coated sequentially, some mechanical mixing of the layers occurs when each contiguous layer is coated. When the layers are coated concurrently, no such mechanical mixing occurs. It is theorized that migration occurs through a diffusion of the monomers into contiguous layers. Minimizing mechanical mixing means better control of the amount of monomer migration between the layers. This enables the skilled artisan to select the processing method that results in the desired amount of migration, even combining concurrently coated layers with sequentially coated layers for certain applications. Further, concurrent coating processes allow multi-layer pressure-sensitive adhesive tapes to be coated and cured in one step, resulting in faster and more economical processing of such tapes.

It has further been discovered that pressure-sensitive tapes may be made by the process of the invention wherein the layers are extremely thin. When the layers are coated in a sequential manner, a minimum layer thickness is about 38 micrometers (1.5 mil). When attempts are made to obtain thinner layers via sequential coating, extreme processing difficulties are encountered. When contact-type sequential coating techniques, i.e., notch bar or reverse roll coating are attempted with layers of less than about 50 micrometers (2.0 mils), the precise machine control required along with the increased solution and web handling difficulties renders the processing line vulnerable to shut down if even a single speck of dirt intrudes. When non-contact type sequential coating techniques, i.e., sequential extrusion or curtain coating, are attempted, normal flow rates will not maintain the fluid film stability of the system. However, when the layers are coated concurrently, layers as thin as 2.5 micrometers may be coated and cured so long as the total thickness of all layers is at least about 38 micrometers (1.5 mils). Without wishing to be bound by theory, it is believed that the increased ability to create thin layers results from the contact of the layers with each other prior to their contact with any carrier web. This creates a multi-layer "superlayer" comprising all concurrently coated layers. The fluid film stability is now dependent on the thickness of this "superlayer", rather than the thickness of each individual layer. Thus, for the first time, thin multi-layered photopolymerized pressure-sensitive adhesive tapes can be made effectively and efficiently by the use of concurrent coating techniques.

Various means of achieving concurrent coatings are encompassed within the invention including, but not limited to multi-layer curtain coating, co-extrusion coating wherein the dies contain multiple manifolds, and use of multiple extrusion dies. The preferred method involves the use of a co-extrusion die having multiple manifolds, as shown in FIG. 1.

A single-coated pressure-sensitive tape of the invention may be made by the process above applying the layers concurrently to a low-adhesion carrier, with one outer layer being a coatable compositions comprising monomers which are photopolymerizable to a pressure-sensitive adhesive state, and one or more contiguous layers being coatable compositions of monomer blends which are photopolymerizable to a non-tacky film state, and being copolymerizable with the pressure-sensitive adhesive outer layer. A double-coated tape may be made by following these steps wherein coatable compositions of both outer layers comprise monomers which are photopolymerizable to a pressure-sensitive adhesive state. The photopolymerizable monomers in the pressure-sensitive adhesive layers may be identical, or may be selected to provide differing specific adhesive properties at each surface of the tape.

A foam-like pressure-sensitive adhesive tape of the invention may be made by a process of the invention comprising the steps of:
(1) preparing a coatable composition having ultraviolet-transparent microbubbles dispersed therein which comprises at least one monomer photopolymerizable to a pressure-sensitive adhesive state;
(2) preparing one or more coatable compositions which are microbubble-free, and comprises at least one photopolymerizable monomer, the monomer being copolymerizable with the monomer in step 1 when blended and subjected to photopolymerization conditions;
(3) concurrently coating the coatable compositions of step 1, and step 2 onto a low-adhesion carrier to form superimposed layers, contiguous layers defining an interface therebetween;
(4) permitting migration of photopolymerizable monomers through the interface between the contiguous layers; and
(5) subjecting the superimposed layers to irradiation to simultaneously photopolymerize the monomers in each layer, and to provide polymeric chains of copolymers of polymerizable monomers originating from contiguous layers extending through the interface therebetween, thereby to produce a tape having layers which cannot be delaminated. In this process as well as the more general process described above, monomers from each, contiguous layer have migrated across the interface, so that after polymerization, a matrix of polymeric chains extends across the interface, substantially comprising monomers from each contiguous layer. It is the formation of such polymeric chains that prevents the layers from being delaminated. Generally, in the preferred foam-like pressure-sensitive adhesive tapes of the invention, the layer containing the microbubbles is thicker than the microbubble-free layer. In making such a foam-like tape of the invention, step 3) of the above-outlined process may involve concurrently applying a thin layer of a microbubble-free coatable composition onto the low-adhesion carrier, a thick coating of the coatable composition containing microbubbles, and a thin coating of a microbubble-free coatable composition. After simultaneously irradiating these coatings, the resulting pressure-sensitive adhesive layer has a thick foam-like core and a thin microbubble-free portion at each of its two surfaces. In this tape, as in all double-coated tapes of the invention, compositions comprising different photopolymerizable monomers may be used in the first and third layers where such would advantageous for the application desired.

The coatable compositions used in tapes of the invention, especially the pressure-sensitive compositions are preferably prepared by premixing together the photopolymerizable monomers and the polar copolymerizable monomer, if used, and photoinitiator. This premix is then partially polymerized to a viscosity in the range of from about 500 cps to about 50,000 cps to achieve a coatable syrup. Alternatively, the monomers can be mixed with a soluble polymeric resin or a thixotropic agent such as fumed silica to achieve a coatable syrup composition.

Elastomer containing phase-separated adhesive compositions are preferably prepared by dissolving or dispersing the elastomer into the alkyl acrylate monomer, and then adding the polar copolymerizable monomer, and photoinitiator. Optional crosslinking agent or other additives may also be incorporated into the syrup.

Photopolymerization is preferably carried out in an inert atmosphere, such as nitrogen. An inert atmosphere can be achieved by temporarily covering the photopolymerizable coating with a plastic film which is transparent to ultraviolet radiation, and irradiating through the film in air. If the photopolymerizable coating is not covered during photopolymerization, the permissible oxygen content of the inert atmosphere can be increased by mixing the coating with a combustible tin compound as taught in U.S. Pat. No. 4,303,485 (Levens), which also teaches such technique for making thick coatings in air.

BRIEF DESCRIPTION OF THE DRAWINGS

FIG. 1 schematically illustrates the manufacture of a preferred pressure-sensitive adhesive tape of the invention.

DETAILED DESCRIPTION OF THE DRAWINGS

As shown in FIG. 1, die-coated coatings 12, 14, and 16, each being a syrup comprising a monomer blend which is photopolymerizable, 12 and 16 being photopolymerizable to a pressure-sensitive adhesive state, 14 being polymerizable to a non-tacky polymeric state are concurrently coated onto ultraviolet-transparent, low-adhesion carrier 10 is concurrently coated by means of a multiple manifold co-extrusion die, 20. The co-extrusion die, 20 is adjacent to the back-up roller, 18. It has three manifolds, 22, 24, and 26 which extrude the photopolymerizable layers 12, 14, and 16 respectively onto the low-adhesion carrier 10. The layers are simultaneously subjected to ultraviolet radiation from a bank of lamps 28, thus photopolymerizing the monomers to provide a layer of pressure-sensitive adhesive which comprises a matrix of polymeric chains that extend across the interfaces between a core and the two surface layers resulting from the polymerization of the coatings 12, 14 and 16.

The carrier 10, instead of being low-adhesion, can have an adhesion-promoting treatment, if necessary, in order to create a permanent bond between the pressure-sensitive adhesive layer and the carrier. A permanently bonded carrier can be selected to provide a tape affording good abrasion resistance and/or corrosion resistance and/or environmental protection. A permanently bonded carrier can be a hot-melt adhesive by which the pressure-sensitive adhesive layer can be bonded to a substrate such as gasketing rubber.

FIG. 1 also shows a close-up view of the co-extrusion die, 20. The three manifolds, 22, 24, and 26 extrude the photopolymerizable layers, bottom, center or "core" layer, and top layer respectively onto the carrier web, 10.

90° Peel Adhesion

The adhesive layer to be tested is transferred to a chemically primed, 50 micrometer aluminum foil backing which then is slit to a width of 2.54 cm (1 inch). The resulting tape is self-adhered to a smooth stainless steel plate under the weight of a 2.04-kg hard-rubber-covered steel roller, 2 passes in each direction. After exposure to the indicated conditions, "90° Peel Adhesion" is measured by moving the free end of the tape away from the steel plate at 90° and at a rate of about 0.5 cm per second (using a tensile tester).

Static Shear Test

This test employs two 25.4-mm wide stainless steel straps as follows: Type 304-2BA, 0.38 mm in thickness, surface roughness 0.05 micrometer arithmetic average deviation from the main line. The strips are washed with heptane (also with MEK if heavy oils are present). A strip of 25.4-mm wide double-coated pressure-sensitive adhesive tape, carried on a low-adhesion liner, is adhered to one end of one of the straps and trimmed to a length of 25.4-mm. The liner is then removed, and the other strap adhered to the exposed adhesive surface The specimen is placed in a horizontal position and rolled down with a 1-kg weight and rested on the assembly for 15 minutes at room temperature. Then the panel with the adhered tape is placed in an air-circulating oven which has been preheated to the indicated temperature, and after 15 minutes, a weight is hung from the free end of the tape, with the top strap vertical. The time at which the weight falls is the "Static Shear Value". If no failure, the test is discontinued at 10,000 minutes (in the 70° C. test) or sometimes at 1440 minutes (in the 121° C. test). Only cohesive failures are reported.

Delamination Test

A specimen of the tape is immersed in a bath of ethyl acetate at ordinary room temperature, then visually examined periodically. Any visual evidence of delamination is reported as a failure. The test is discontinued if there has been no failure after 24 hours.

Tensile Strength/Elongation

A 5 cm long by 2.5 cm wide strip of the tape is placed between two jaws of an Instron at 21° C. (70° F.) and 50% relative humidity. The jaws are separated at a constant speed of 13 cm/min. The elongation is reported as the percent elongation required for the sample to break. The tensile strength is measures as the actual force on the sample immediately at break. The force is converted to newtons per square centimeter units. When the sample consists of a double-coated tape with a nonpressure-sensitive backing, the cross-sectional area of the nonpressure-sensitive backing is used to compute the tensile strength.

In the following examples, parts are given by weight. The glass microbubbles used in the examples had a density of 0.15 g/cm$^3$ and were 20–150 micrometers in diameter (average 55 micrometers).

Examples 1 and 2

Two syrups were prepared from 90 parts of isooctyl acrylate and 10 parts of acrylic acid. The first syrup (Syrup #1) was modified with 0.04 phr (phr - parts per hundred resin) of 2,2-dimethoxy-2-phenyl acetophenone photoinitiator, Irgacure TM 651, and was partially polymerized by ultraviolet radiation to a viscosity of approximately 3300 cps (Brookfield), and a degree of polymerization of about 8%. The polymer had an inherent viscosity of about 4.0. An additional 0.15 phr of Irgacure TM 651 was added. 0.10 phr of a 4-(p-methoxyphenyl)-2,6-bis trichloromethyl s-triazine crosslinking agent was also added.

The second syrup (Syrup #2) comprised 90 parts isooctyl acrylate and 10 parts of acrylic acid along with 65 phr of n-butyl/methyl methacrylate copolymer, Acryloid B-66 TM from The Rohm and Haas Company, 2 phr of trimethylolpropane ethoxylate triacrylate (Oxychem TM Photomer 4149 TM ), and 0.25 phr of the triazine crosslinking agent described above. An ultraviolet photopolymerized coating of this syrup will yield a non-tacky polymeric material, useful as a nonpressure-sensitive backing.

Two double coated tapes were prepared by casting three layers of syrup against a low-adhesion carrier followed by irradiation with 350 mJ/cm² (Dynachem Radiometer ™ Model 500) UV energy from a bank of lamps, 90% of the emissions of which were between 300 and 400 nm with a maximum at 351 nm. Coating was done using a three manifold co-extrusion die such that the three layers were concurrently coated. The thickness of the layers were as follows:

|  | Example 1 | Example 2 |
|---|---|---|
| Layer 1 | 50 μm-Syrup #1 | 50 μm-Syrup #1 |
| Layer 2 | 75 μm-Syrup #2 | 178 μm-Syrup #2 |
| Layer 3 | 50 μm-Syrup #1 | 50 μm-Syrup #1 |

Comparative Examples 1 and 2

Double-coated tapes were made in an identical manner to Examples 1 and 2, except that coating was sequentially accomplished using three consecutive knife coaters. These tapes along with the tapes of Examples 1 and 2 were tested, and the results reported in Table 1.

TABLE 1

|  | Ex. 1 | Comp. Ex. 1 | Ex. 2 | Comp. Ex. 2 |
|---|---|---|---|---|
| Tensile Strength (N/cm²) | 986 | 147 | 924 | 199 |
| Elongation (%) | 283 | 464 | 210 | 311 |
| 90° Adhesion (N/dm) |  |  |  |  |
| 15 min @ 23° C./50% R.H. | 28 | 63 |  |  |
| 72 hr. @ 23° C./50% R.H. | 123 | 127 |  |  |
| 72 hr. @ 70° C. | 186 | 182 |  |  |
| Delamination Test (minutes) | Passed | Passed | Passed | Passed |

Comparative Examples 3-6

Double-coated pressure-sensitive adhesive tapes were made as described in Example 1, and coated to the constructions described above. It was observed during coating of Example 6, that the microbubbles from syrup 3# were clearly seen in the "rolling bank" of syrup #1 in the next sequential knife coater, thus indicating physical mixing of the layers.

Examples 3-6

Syrup #3 is prepared by adding 0.5 phr of polymeric microbubbles (Miralite ™ -177) to syrup #2. Examples 3-6 are coated as described in Example 1. The layers have the following thicknesses:

TABLE 1.1

| Layer | Syrup # | Example 3 | Example 4 | Example 5 | Example 6 |
|---|---|---|---|---|---|
| 1 | 1 | 50 μm | 50 μm | 75 μm | 75 μm |
| 2 | 3 | 300 μm | 400 μm | 550 μm | 750 μm |
| 3 | 1 | 50 μm | 50 μm | 50 μm | 75 μm |

Example 7 and Comparative Example 7

Syrup #4 was prepared in a manner similar to syrup #1 except that the monomers consisted of 80 parts of isooctyl acrylate and 20 parts of N-vinyl-2-pyrrolidone. The levels of photoinitiator and photoactive crosslinker remain the same as in Syrup #1.

Two two-layer pressure-sensitive adhesive tapes were made as in Example 1, except that they were irradiated with 200 mJ/cm² UV energy. Both tapes had the following construction, and were coated using a multiple manifold co-extrusion die for Example 7, and sequential notched bar coating for Comparative Example 7 respectively:

| Layers | Thickness |
|---|---|
| Layer 1 | 75 μm-syrup #1 |
| Layer 2 | 50 μm-syrup #4 |

Layer 2 was the layer against the low-adhesion carrier. The test results are shown in Table 3.

TABLE 3

|  | Ex. 7 | Comp. Ex. 7 |
|---|---|---|
| 90° Peel Adhesion (N/dm) |  |  |
| 15 min @ 23° C./50% R.H. | 77 | 83 |
| 72 hr. @ 23° C./50% R.H. | 151 | 164 |
| 72 hr. @ 70° C. | 245 | 50 |
| Static Shear (min.)-70° C. | 3227 | 49 |
| 23° C. | 10000 | 5366 |
| Delamination Test (minutes) | Passed | Passed |

Examples 8-12

Syrup #5 was prepared using a partially polymerized mixture of 75 parts of isooctyl acrylate and 25 parts of acrylic acid. The syrup contained 0.16 phr Irgacure ™ 651 and 0.08 phr of the triazine crosslinker described in Example 1.

Five double-coated pressure-sensitive adhesive tapes were made. In each case, three tape layers were superimposed in the following order; syrup #1, syrup #5, and syrup #1 respectively. In each case, the total thickness of all three layers was 178 μm, and the two layers of syrup #1 were the same thickness as described below. All samples were irradiated with 400 mJ/cm² of Uv energy.

| Example No. | Syrup #1 | Syrup #5 |
|---|---|---|
| 8 | 13 μm | 150 μm |
| 9 | 25 μm | 128 μm |
| 10 | 38 μm | 102 μm |
| 11 | 50 μm | 78 μm |
| 12 | 64 μm | 50 μm |

Comparative Example 11

A double-coated pressure-sensitive adhesive tape was produced as in Example 11 using three sequential notched bar coatings. The construction was as follows:

| Layer 1 | 40 μm-syrup #1 |
|---|---|
| Layer 2 | 75 μm-syrup #5 |
| Layer 3 | 48 μm-syrup #1 |

The tapes were tested for 90° Peel Adhesion and the tapes of Examples 8-12 were tested for Delamination. The test results are reported in Table 4.

TABLE 4

|  | 90° Peel Adhesion (N/dm) | | | |
|---|---|---|---|---|
|  | 15 min. 23° C. | 72 hr. 23° C. | 72 hr. 70° C. | Delamination Test |
| Example 8 | 22 | 26 | 22 | Passed |
| Example 9 | 28 | 48 | 28 | Passed |
| Example 10 | 79 | 66 | 77 | Passed |
| Example 11 | 74 | 147 | 193 | Passed |
| Example 12 | 92 | 223 | 256 | Passed |

TABLE 4-continued

| | 90° Peel Adhesion (N/dm) | | | |
|---|---|---|---|---|
| | 15 min. 23° C. | 72 hr. 23° C. | 72 hr. 70° C. | Delamination Test |
| Comp. Example 11 | 35 | 70 | 206 | — |

Examples 12-15

Syrup #6 was prepared using a partially polymerized mixture consisting of 96 parts isooctyl acrylate and 4 parts acrylic acid, along with 0.19 phr Irgacure TM 651 and 0.10 phr of the triazine crosslinker described in Example 1.

Four pressure-sensitive adhesive tapes were then made with one surface being made nonpressure-sensitive by coating a layer of syrup #6 against a low-adhesion carrier and concurrently coating a 90 μm (3.5 mils) layer of Syrup #2 over this layer. The layers were irradiated simultaneously with 200 mJ/cm$^2$ of UV energy. The thicknesses of the layers were as follows:

| Example No. | Syrup #6 Layer | Syrup #2 Layer |
|---|---|---|
| Example 12 | 13 μm | 90 μm |
| Example 13 | 25 μm | 90 μm |
| Example 14 | 38 μm | 90 μm |
| Example 15 | 50 μm | 90 μm |

The tapes were tested for 90° Peel Adhesion and Delamination. The results are listed in Table 5.

TABLE 5

| | Ex. 12 | Ex. 13 | Ex. 14 | Ex. 15 |
|---|---|---|---|---|
| 90° Peel Adhesion (N/dm) | | | | |
| (Stainless Steel) | | | | |
| 15 min @ 23° C./50% R.H. | 0 | 4 | 9 | 9 |
| 72 hr. @ 23° C./50% R.H. | 4 | 11 | 24 | 42 |
| 72 Hr. @ 70° C. | 9 | 31 | 85 | — |
| Delamination Test (minutes) | Passed | Passed | Passed | Passed |

Examples 16-19

Syrup #7 was prepared using a partially polymerized mixture consisting of 93.5 parts isooctyl acrylate and 6.5 parts acrylic acid, along with 0.39 phr Irgacure TM 184 crosslinker and 0.15 phr of the triazine crosslinker described in Example 1. Three separate syrups were then made by adding the indicated amount of Foral TM 85 tackifying agent to syrup #7.

Three pressure-sensitive adhesive tapes were then made by coating a layer of the tackified syrup #7 against a low-adhesion carrier and concurrently coating a center layer of Syrup #1 over this layer, and an outer layer of tackified syrup #7 over this layer. The thicknesses, and level of tackification of the individual layers are as listed below.

These tapes were then tested for adhesion to varying substrates, static shear and delamination. The results are listed in Table 6.

| Example No. | Syrup #7 | Syrup #1 | Syrup #7 | Foral TM 85 |
|---|---|---|---|---|
| 16 | 10 μm | 105 μm | 10 μm | 46.8 phr |
| 17 | 3.75 μm | 117.5 μm | 3.75 μm | 30 phr |
| 18 | 12.5 μm | 100 μm | 12.5 μm | 20 phr |

TABLE 6

| *90° Peel Adhesion (N/dm) | Ex. 16 | Ex. 17 | Ex. 18 |
|---|---|---|---|
| Stainless Steel | | | |
| 15 min @ 23° C./50% R.H. | 154 | 158 | — |
| 72 hr. @ 23° C./50% R.H. | 189 | 189 | — |
| 72 Hr. @ 70° C. | 279 | 270 | — |
| ABS | | | |
| 15 min @ 23° C./50% R.H. | 121 | 147 | — |
| 72 hr. @ 23° C./50% R.H. | 121 | 158 | — |
| 72 Hr. @ 70° C. | 134 | 140 | — |
| Polypropylene | | | |
| 15 min @ 23° C./50% R.H. | 101 | 68 | — |
| 72 hr. @ 23° C./50% R.H. | 86 | 66 | — |
| 72 Hr. @ 70° C. | 86 | 66 | — |
| Static Shear (min.) 23° C. | 887 | 10000 | 10000 |
| Delamination Test | Passed | Passed | Passed |

*These 90° Peel Adhesion tests were conducted using a 200 micrometer (8 mil) aluminum backing rather than the standard 50 micrometer (2 mil) backing.

Examples 20-23

Syrup #8 was prepared using a mixture consisting of 90 parts isooctyl acrylate and 10 parts acrylic acid, along with 0.18 phr Irgacure TM 651, and adding 20 phr Stereon TM 845A, a styrene-butadiene multiblock copolymer with 48% styrene, available from Firestone. Syrup #9 was prepared using a mixture consisting of 85 parts isooctyl acrylate and 15 parts acrylic acid, along with 0.18 phr Irgacure TM 651, and adding 20 phr Duradene TM 710, a butadiene styrene copolymer having 27% styrene, available from Firestone. Syrup #10 was prepared using a mixture consisting of 85 parts isooctyl acrylate and 15 parts acrylic acid, along with 0.18 phr Irgacure TM 651, and adding 20 phr Kraton TM D1101, a styrene/butadiene/styrene block copolymer with 30% styrene, available from Shell Chemical Company.

Three pressure-sensitive adhesive tapes were then made by coating a 55 μm thick layer of syrup #6 against a low-adhesion carrier and concurrently coating a 164 μm thick center layer of Syrup #1 over this layer, and then coating a 55 μm thick outer layer of syrups #8, 9 and 10, respectively, over this layer. All samples passed the delamination test.

What is claimed is:

1. A process for making a pressure-sensitive adhesive tape comprising a plurality of concurrently coated simultaneously photopolymerized superimposed layers, said layers having been simultaneously photopolymerized, at least one outer layer being a pressure-sensitive adhesive layer, said pressure-sensitive adhesive layer comprising at least one alkyl acrylate ester of a nontertiary alcohol, and a photoinitiator, contiguous layers defining an interface therebetween, each of said layers comprising a photopolymerized matrix of polymeric chains; said polymeric chains extending from the matrix of one of said layers through said interface into the matrix of a contiguous layer; said polymeric chains comprising polymerized monomers having migrated from the matrix of each contiguous layers, said process comprising the steps of:

(1) preparing a plurality of coatable compositions, each of said coatable compositions comprising at least one photopolymerizable monomer; at least one of said coatable compositions being curable to a pressure-sensitive adhesive state, monomers of each of said coatable compositions being copolymerizable when blended and subjected to photopolymerization conditions;

(2) concurrently coating said coatable compositions to provide a plurality of superimposed layers with contiguous layers defining an interface therebetween, with one composition which is curable to a pressure-sensitive adhesive state being coated as an outer layer;

(3) permitting migration of photopolymerizable monomers through said interface between contiguous layers; and (4) subjecting said superimposed layers to irradiation to simultaneously photopolymerize said monomers in each layer, and to provide polymeric chains comprised of copolymers of photopolymerizable monomers originating from contiguous layers extending through said interface therebetween;

thereby to produce a tape having layers which cannot be delaminated.

2. A process according to claim for making a pressure-sensitive adhesive tape having an adhesive layer comprising from about 40% to about 95% isooctyl acrylate, and from 5% to about 60% of a polar copolymerizable monomer selected from the group consisting of N-vinyl pyrrolidone and acrylic acid, said process comprising the steps of:

(1) preparing one or more coatable compositions which are photopolymerizable to yield a non-tacky polymeric material;

(2) preparing a coatable composition containing at least one monomer which is photopolymerizable to a pressure-sensitive adhesive state, said monomer being copolymerizable with the monomer in step 1 when blended and subjected to photopolymerization conditions;

(3) concurrently coating said coatable compositions of step 1, and step 2 onto a carrier to form superimposed layers, contiguous layer defining an interface therebetween;

(4) permitting migration of photopolymerizable monomers through said interface between said contiguous layers; and (5) subjecting said superimposed layers to irradiation to simultaneously photopolymerize said monomers in each layer, and to provide polymeric chains comprised of copolymers of photopolymerizable monomers originating from contiguous layers extending through said interface therebetween;

thereby to produce a tape having which cannot be delaminated.

3. A process according to claim 1 for making a pressure-sensitive tape wherein at least one layer further comprises from about 5% to about 65% volume percent ultraviolet transparent microbubbles having a specific gravity of no more than 1.0, said process comprising the steps of:

(1) preparing a coatable composition having said ultraviolet-transparent microbubbles dispersed therein which comprises at least one monomer photopolymerizable to a pressure-sensitive adhesive state;

(2) preparing one or more coatable compositions which are microbubble-free, and comprise at least one photopolymerizable monomer, said monomer being copolymerizable with the monomer in step 1 when blended and subjected to photopolymerization conditions;

(3) concurrently coating said coatable compositions of step 1, and step 2 onto a low-adhesion carrier to form superimposed layers, said contiguous layers defining an interface therebetween;

(4) permitting migration of photopolymerizable monomers through said interface between said contiguous layers; and (5) subjecting said superimposed layers to irradiation to simultaneously photopolymerize the monomers in each layer, and to provide polymeric chains of copolymers of polymerizable monomers originating from contiguous layers extending through the interface therebetween;

thereby to produce a tape having layers which cannot be delaminated.

* * * * *

UNITED STATES PATENT AND TRADEMARK OFFICE
CERTIFICATE OF CORRECTION

PATENT NO. : 4,894,259

DATED : JANUARY 16, 1990

INVENTOR(S) : DOUGLAS H. KULLER

It is certified that error appears in the above-identified patent and that said Letters Patent is hereby corrected as shown below:

Col. 10, line 47, After "would", add --be--.

Col. 12, line 6, There should be a --.-- after "surface."

Col. 12, line 32, "measures" should be --measured--.

Col. 13, line 40, "3#" should be --#3--.

Col. 14, line 36, "Uv" should be --UV-.

Col. 17, line 22, After "claim" insert --1--.

Col. 17, line 42, "layer" should be --layers--.

Col. 18, line 10, After "having" insert --layers--.

Signed and Sealed this

Twenty-ninth Day of January, 1991

Attest:

HARRY F. MANBECK, JR.

Attesting Officer

Commissioner of Patents and Trademarks